Figure 1:
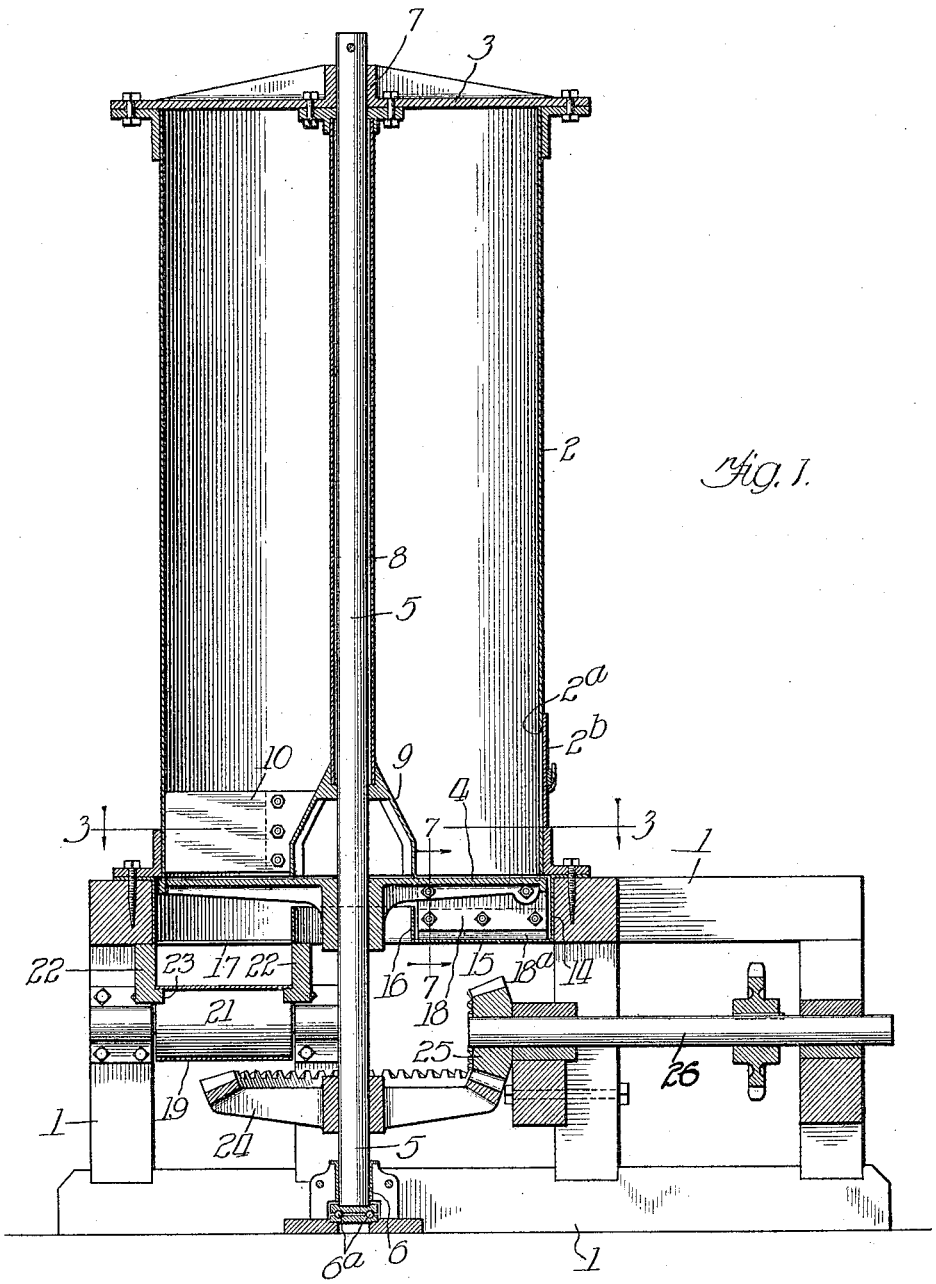

E. F. ROSE & T. BEACH.
BEET SHREDDER.
APPLICATION FILED AUG. 5, 1910.

1,069,580.

Patented Aug. 5, 1913.
3 SHEETS—SHEET 1.

Witnesses:
Robert N. Weir
C. Paul Parker

Inventors:
Edward F. Rose
Thomas Beach
By Luther L. Miller Atty.

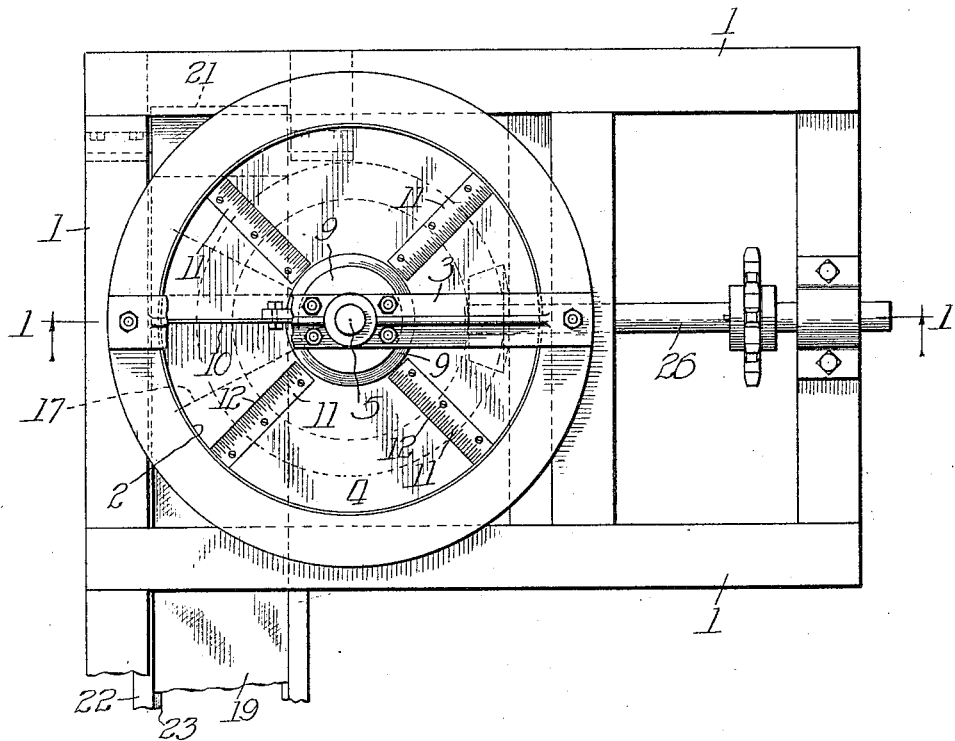
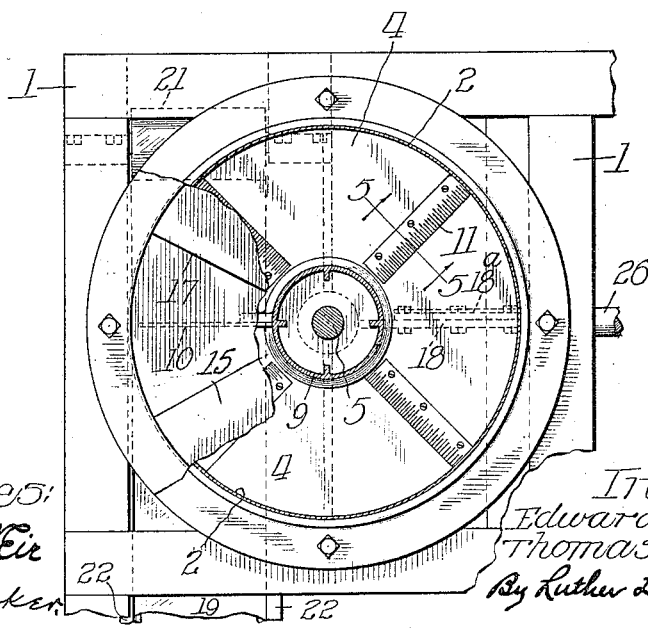

E. F. ROSE & T. BEACH.
BEET SHREDDER.
APPLICATION FILED AUG. 5, 1910.
1,069,580.
Patented Aug. 5, 1913.
3 SHEETS—SHEET 3.
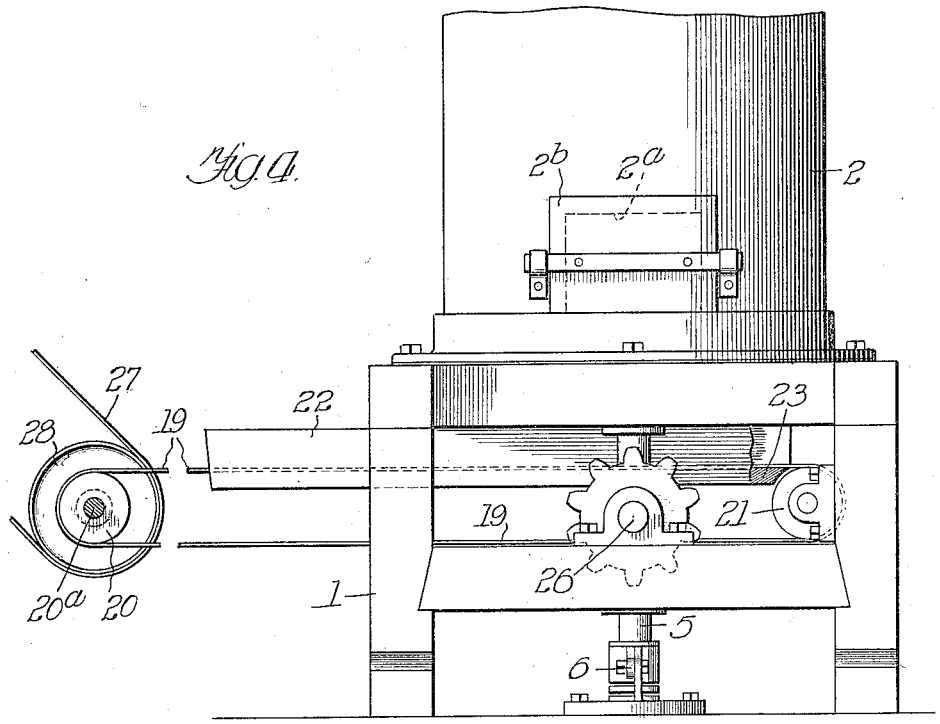
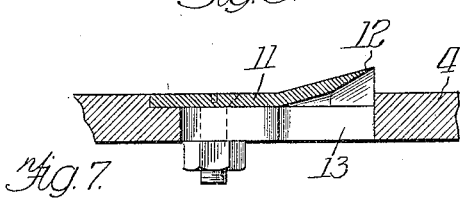
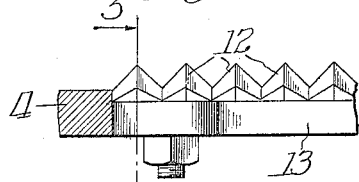
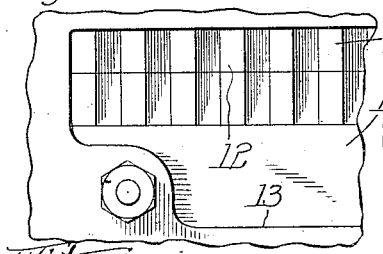
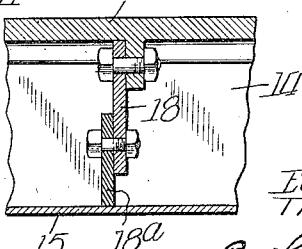
Witnesses:
Robert N. Weir
C. Paul Parker
Inventors:
Edward F. Rose
Thomas Beach
By Luther L. Miller, Atty.

UNITED STATES PATENT OFFICE.

EDWARD F. ROSE AND THOMAS BEACH, OF FORT COLLINS, COLORADO.

BEET-SHREDDER.

1,069,580.     Specification of Letters Patent.     Patented Aug. 5, 1913.

Application filed August 5, 1910. Serial No. 575,796.

*To all whom it may concern:*

Be it known that we, EDWARD F. ROSE and THOMAS BEACH, citizens of the United States, residing at Fort Collins, in the county of Larimer and State of Colorado, have invented certain new and useful Improvements in Beet-Shredders, of which the following is a specification.

The object of this invention is to produce a machine which is especially adapted to reduce sugar beets and the like to the form best adapted for cattle feeding purposes. The beet cutters heretofore produced are designed to reduce the beets into the form best adapted for the extraction of their sugar content in beet sugar factories, that is to say, in long strings, whereas for feeding purposes it is desirable that the fragments be short, say, one inch or less in length.

The invention also relates to the other improvements in beet shredders hereinafter set forth.

In the accompanying drawings, Figure 1 is a vertical central section through a beet shredder embodying the features of our invention. Fig. 2 is a top plan view of said machine with portions broken away. Fig. 3 is a section on line 3 3 of Fig. 1. Fig. 4 is a fragmental side elevation of the machine. Figs. 5, 6 and 7 are fragmental detail views of one of the rotating knives, Fig. 5 being a section on line 5 5 of Figs. 3 and 6; Fig. 6 a front edge view; and Fig. 7 an underside view. Fig. 8 is a section on line 7 7 of Fig. 1.

The embodiment which we have selected for illustration comprises a supporting framework 1 upon which is supported in a vertical position a cylindrical hopper or casing 2. A cross-bar 3 extends across the upper open end of said hopper.

At the lower end of the hopper 2 forming the bottom thereof is a disk 4 rigidly fixed upon a vertical shaft 5 which shaft is supported in a step bearing 6 and in a bearing 7 in the cross-bar 3. If desired, the step bearing 6 may be provided with a suitable number of anti-friction balls 6$^a$.

Surrounding the shaft 5 within the casing 2 is a tube 8 fixed at its upper end to the cross-bar 3 and at its lower end to the apex of a generally conical casting 9, said casting having a central bearing which fits about the shaft 5. A bar 10 is rigidly fixed to said casting and extends in a vertical plane from said casting to one side of the hopper 2. This bar constitutes the stationary element of the cutting or shredding mechanism.

The movable element of the shredding mechanism comprises a suitable number of knives 11 secured to the disk 4. As herein shown, said knives occupy radial positions upon the disk between the periphery of the conical member 9 and the hopper 2 and pass in succession beneath the lower edge of the bar 10. The conical member 9 serves to direct the beets outwardly away from the center of the hopper where the movement is slow, and into the path of the traveling knives 11, the beets being shredded by knives coacting with the stationary bar 10. As shown in Figs. 5 and 6, each of the knives 11 consists of a plate having its forward edge bent upwardly and having a plurality of upwardly inclined wedge shaped teeth 12 formed in said forward edge, said edge having a corrugated appearance. An opening 13 is formed through the disk 4 below the cutting portion of each knife 11 so that the fragments cut from the beets by the tooth edged knife pass downwardly through said opening. As will be understood from an inspection of Fig. 5, the inclined lower side of the knife causes the beet shreds to be forced downwardly through said opening in the rotation of the knife.

The casing 2 may have an opening 2$^a$ therein near its lower end to permit access to the interior of the casing for the purpose of repairing or removing the cutting means. A door 2$^b$ of any suitable form normally closes the opening 2$^a$.

14 is an annular casing or short cylinder within which the disk 4 rotates, said casing being fixed in the machine framework concentric with the disk 4 and the hopper 2. The bottom of this casing consists of a horizontal plate 15 stationarily supported in the framework, and having a central annular upwardly extending flange 16. It will be seen from Fig. 1 that the casing 14 with its bottom plate 15 and the flange 16 form an annular trough. Below the bar 10 the bottom plate 15 is cut away to form an opening 17 through which the beet shreds may be dropped onto a suitable receptacle such as a conveyer. Fixed to the lower side of the disk 4 is a sweep 18 which serves to sweep the shredded material out of the trough and into the opening 17 as the disk rotates. Preferably the lower portion of the sweep consists of yielding material such as a strip of belting 18ª (Fig. 8).

Any suitable form of conveyer may be provided to remove the shredded beets discharged through the opening 17. Herein, we have shown an endless belt conveyer consisting of an endless belt 19 extending over rollers 20 and 21, the upper run of said belt passing between side walls 22 and being supported upon flanges 23 on said walls. The receiving end of the conveyer is located below the opening 17.

The cutter carrying disk 4 is rotated by means herein shown as consisting of a bevel gear 24 fixed on the shaft 5 and meshing with a bevel pinion 25 fixed upon a horizontal shaft 26. The shaft 26 may be driven in any convenient manner.

The conveyer 19 may be driven in any preferred way as by means of a belt 27 extending over a pulley 28 fixed upon the shaft 20ª of the roller 20.

In use, beets are introduced into the hopper 2 through the open upper end of the latter and rest upon the disk 4. When said disk is rotated, the knives 11 shred the beets, the greater part of the reduction taking place at the bar 10. The shredded material passes through the openings 13 in the disk 4 and fall into the trough 14, 15, 16, or through the opening 17 onto the conveyer. That portion which falls onto the bottom plate 15 is swept into the opening 17 by the sweep 18.

The cutting or shredding mechanism hereinbefore described causes the beets to be reduced to shreds or pieces of an inch or less in length which is the size preferred for feeding purposes.

We claim as our invention:

In a beet-shredder, in combination, a casing; a cross-head at the upper end of said casing; a bearing in said cross-head; a vertical shaft located centrally of said casing and having its upper end running in said bearing; a disk fixed on said shaft and forming the bottom of said casing; means for rotating said shaft; a sleeve surrounding said shaft and having its upper end secured to said bearing; a conical member having its apex secured to the lower end of said sleeve and having a bearing which fits about said shaft; a stationary bar secured to one end of said conical member and extending radially outward to the casing; and a plurality of knives mounted in said disk between the periphery of said conical member and the casing, said conical member serving to direct the beets outwardly away from the center of the casing and into the path of said knives, the latter coacting with said bar to shred the beets.

EDWARD F. ROSE.
THOMAS BEACH.

Witnesses:
MATTHEW J. WILLIAM,
DONALD MOSSMAN.

---

Copies of this patent may be obtained for five cents each, by addressing the "Commissioner of Patents, Washington, D. C."